(12) United States Patent
Akiyama et al.

(10) Patent No.: US 8,400,703 B2
(45) Date of Patent: Mar. 19, 2013

(54) OPTICAL SWITCH

(75) Inventors: Eiji Akiyama, Minato-ku (JP); Fujio Okumura, Minato-ku (JP); Osamu Ishibashi, Minato-ku (JP)

(73) Assignee: NEC Corporation, Tokyo (JP)

( * ) Notice: Subject to any disclaimer, the term of this patent is extended or adjusted under 35 U.S.C. 154(b) by 44 days.

(21) Appl. No.: 12/663,398

(22) PCT Filed: Jun. 18, 2008

(86) PCT No.: PCT/JP2008/061155
§ 371 (c)(1),
(2), (4) Date: Dec. 7, 2009

(87) PCT Pub. No.: WO2008/156118
PCT Pub. Date: Dec. 24, 2008

(65) Prior Publication Data
US 2010/0182672 A1    Jul. 22, 2010

(30) Foreign Application Priority Data

Jun. 19, 2007  (JP) ................................. 2007-161590

(51) Int. Cl.
*G02B 26/00* (2006.01)
*G02F 1/01* (2006.01)
*G02F 1/03* (2006.01)
*G02F 1/07* (2006.01)
(52) U.S. Cl. .................. 359/263; 359/238; 359/245
(58) Field of Classification Search .................. 359/245, 359/252, 263
See application file for complete search history.

(56) References Cited

U.S. PATENT DOCUMENTS 7,564,610 B2 * 7/2009 Fujimori ....................... 359/245
2002/0118433 A1 * 8/2002 Romanovsky ................ 359/245

FOREIGN PATENT DOCUMENTS

| JP | 50-130458 A | 10/1975 |
| JP | 57-112722 A | 7/1982 |
| JP | 60-125829 A | 7/1985 |
| JP | 60-202416 A | 10/1985 |
| JP | 64-046733 A | 2/1989 |
| JP | 01-186919 A | 7/1989 |
| JP | 2666805 B2 | 8/1989 |
| JP | 2006-276654 A | 10/2006 |
| JP | 2006-293018 A | 10/2006 |
| JP | 2007-65458 A | 3/2007 |

OTHER PUBLICATIONS

Translation JP 01214827 Aug. 28, 1989.*

* cited by examiner

*Primary Examiner* — Ricky Mack
*Assistant Examiner* — Mahidere Sahle
(74) *Attorney, Agent, or Firm* — Sughrue Mion, PLLC

(57) ABSTRACT

An optical switch for switching between transmission and total reflection of incident light 101 applied to electro-optical crystal 104 by applying an electric field to electro-optical crystal 104 to thereby change the refractive index of electro-optical crystal 104 includes a plurality of electrodes 105 disposed in electro-optical crystal 104 to provide electrode assembly 106 for applying the electric field to electro-optical crystal 104. Electro-optical crystal 104 has a refractive index changing portion (not shown) whose refractive index is changed by the electric field applied by electrode assembly 106, the refractive index changing portion enclosing electrode assembly 106 in its entirety. The refractive index changing portion has a flat refractive index boundary.

10 Claims, 14 Drawing Sheets

(a)

(b)

(a) APPLIED VOLTAGE (b) REFRACTIVE INDEX (c) LIGHT OUTPUT

OPTICAL SWITCH

TECHNICAL FIELD

The present invention relates to an optical switch for switching between transmission and reflection of light.

BACKGROUND ART

In the field of optical communications, there are known numerous devices for performing switching of light by applying a voltage to a substance having an electro-optical effect to cause the refractive index thereof to change under a generated electric field. There have been proposed optical switches with waveguides constructed therein, including a directional-coupler-type optical switch which utilizes the proximity effect of two waveguides and a Mach-Zehnder-interferometer-type optical switch which utilizes an interference of light by applying a voltage between waveguides from an external source to generate a phase difference. These waveguide-type optical switches are capable of performing high-speed switching because they can change the refractive index at a high speed.

JP-A No. 2006-293018 proposes an optical switch comprising a crossed-Nicols optical system for rotating the plane of vibration of light which has been linearly polarized by birefringence due to a primary electro-optical effect (Pockels effect) or a secondary electro-optical effect (Kerr effect). Since this electro-optical optical switch employs an electro-optical effect, it is capable of operating as fast as the waveguide-type optical switches.

JP-A No. 2006-276654 proposes an optical switch which employs a nonlinear optical thin film including a fine crystal of a metal oxide that is excitable by visible light and which controls the reflection and transmission of incident light by inducing a reflecting phenomenon with visible exciting light applied from an external source.

There have been proposed numerous optical switches for changing incident light selectively to transmitted light and reflected light by applying a voltage to an electro-optical crystal to generate an electric field for inducing a change in the refractive index.

FIG. 1 shows the basic structure of a general optical switch which is relevant to the present invention. Two electrodes 1121 each made of an electron conductor are disposed in confronting relation to each other on respective side surfaces of electro-optical crystal 1104 in the form of a block. Two electrodes 1121 are connected to external power supply 1107 such that they have different polarities. When external power supply 1107 applies a voltage to two electrodes 1121, an electric field is generated between two electrodes 1121, producing refractive index changing portion 1108. When external power supply 1107 applies no voltage, the refractive index does not change between two electrodes 1121, and hence incident light 1101 travels straight through electro-optical crystal 1104 and is emitted out as transmitted light 1102. When external power supply 1107 applies a voltage, the refractive index changes between two electrodes 1121, and hence incident light 1101 which has an incident angle greater than the critical angle is reflected by electro-optical crystal 1104 and is emitted as reflected light 1103. By thus applying an appropriate voltage to electrodes 1121, the refractive index of electro-optical crystal 1104 is changed to switch between the transmission and reflection of light, thereby providing a function as an optical switch.

The directional-coupler-type optical switch and the Mach-Zehnder-interferometer-type optical switch described above need to be fabricated by a complex fabrication process because it is necessary to form waveguides in a crystal. Consequently, it is difficult to reduce the size of their devices and they are fabricated at a high cost. The optical switch comprising a crossed-Nicols optical system described above is problematic in that since the distance between the electrodes is large, an operating voltage is high and power consumption is large in order to obtain a desired rotational angle.

Patent document 1 discloses that the applied voltage is lowered by increasing the length of the optical path. However, as the increased length of the optical path requires a large crystal, the optical switch becomes highly costly, and the large crystal prevents the optical switch from being reduced in size and weight. The optical switch comprising a crossed-Nicols optical system does not lend itself to smaller device sizes because a phase difference is caused by the birefringence of the crystal, separately requiring a phase compensation wave plate. In addition, since the electrode length is increased and the electrode area is wider, the capacitance becomes greater and power consumption also becomes higher, making it difficult for the optical switch to operate at a high speed. Furthermore, the optical switch is disadvantageous in that it is not possible to obtain a high extinction ratio because the linearly polarized incident light is scattered by the crystal.

The optical switch disclosed in Patent document 2 cannot be reduced in size and weight because exciting light is separately required to excite the nonlinear optical film. Furthermore, the optical switch is disadvantageous in that since the signal light is switched by controlling the exciting light, the mechanism of the optical switch is more complex than a voltage control system employing an electro-optical crystal and is incapable of high-speed switching.

The optical switch according to the background art, in which a voltage is applied between the electrodes on the respective side surfaces of the electro-optical crystal to generate an electric field for inducing a change in the refractive index for changing incident light selectively to transmitted light and reflected light, suffers from structural problems in that it is difficult to reduce the thickness of the crystal to 100 μm or smaller due to limitations posed by crystal production or packaging, and the power consumption is large because a high drive voltage is required due to the large distance between the electrodes.

It is assumed that the power consumption is represented by P, the operating frequency by f, the capacitance between the electrodes on the crystal by C, the dielectric constant of vacuum by $\varepsilon_0$, the relative permittivity by $\varepsilon_r$, the beam diameter by r, the critical angle by $\theta_m$, the length of the electrodes required to reflect a beam with the beam diameter r at the critical angle $\theta_m$, the width of the electrodes by w, the interval between the electrodes by d, the refractive index by $n_0$, the change in the refractive index by $\Delta n$, the Kerr constant by s, and the electric field E. These parameters are related to each other according to the following equations:

$$P = 2\pi f C V^2$$

$$C = \frac{\varepsilon_0 \varepsilon_r L w}{d}$$

$$L = \frac{r}{\cos(\theta_m)}$$

$$\theta_m = a\sin\left\{\frac{(\Delta n + n_0)}{n_0}\right\}$$

$$\Delta n = -\frac{1}{2} n_0^3 s E^2$$

-continued $$E = \frac{V}{d}$$

From the above equations, the following equations (1), (2) are obtained:

$$\theta_m = a\sin\left\{\alpha\left(\frac{V}{d}\right)^2 + 1\right\} \quad (1)$$

$$P = \beta d \quad (2)$$

where α, β represent coefficients, respectively.

It can be understood from the equation (1) that in order to obtain the same critical angle, the drive voltage V becomes higher in proportion to the distance d between the electrodes. It can also be understood from the equation (2) that power consumption P becomes higher in proportion to distance d between the electrodes.

General optical switches used for optical communications are required to have an extinction ratio of about 10:1, which is not sufficient in applications to image display devices such as displays. The optical switch shown in FIG. 1 which is relevant to the present invention has the same problems as the optical switches for use in optical communications in that it is very difficult for refractive index changing portion 1108 to fully reflect the incident light totally, and no sufficient extinction ratio can be achieved because the incident light is divided into a transmitted component and a reflected component.

DISCLOSURE OF THE INVENTION

It is an object of the present invention to provide an optical switch which is capable of producing a large refractive index change under a low operating voltage for thereby lowering power consumption.

An optical switch according to the present invention, for switching between transmission and total reflection of incident light applied to an electro-optical crystal by applying an electric field to the electro-optical crystal thereby to change the refractive index of the electro-optical crystal, comprises a plurality of electrodes disposed in said electro-optical crystal to provide an electrode assembly for applying the electric field to the electro-optical crystal, wherein said electro-optical crystal has a refractive index changing portion whose refractive index is changed by the electric field applied by said electrode assembly, said refractive index changing portion enclosing said electrode assembly in its entirety, and said refractive index changing portion has a flat refractive index boundary.

Another optical switch according to the present invention, for switching between transmission and total reflection of incident light applied to an electro-optical crystal by applying an electric field to the electro-optical crystal thereby changing the refractive index of the electro-optical crystal, comprises an electrode assembly disposed in said electro-optical crystal and comprises a plurality of electrodes having main cross sections of maximum areas disposed in one plane.

BEST MODE FOR CARRYING OUT THE INVENTION

Examples of the present invention will be described below with reference to the drawings.

First Example

Figure 2:
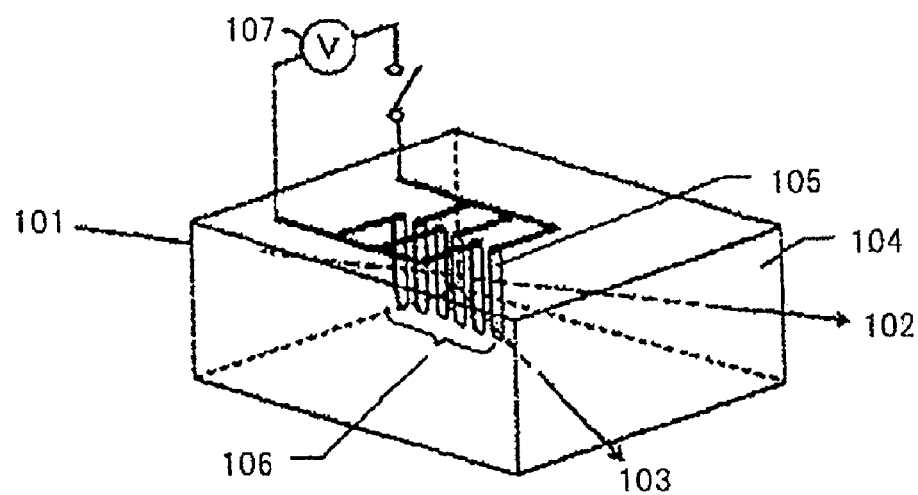
FIG. 2 is a view showing an optical switch according to a first example of the present invention.

A first example of the present invention will be described below with reference to FIG. 2. Needle-shaped electrodes 105 are formed in electro-optical crystal 104 by forming a plurality of straight pits into electro-optical crystal 104 from an upper surface thereof by etching or the like, and by depositing an electron conductor which can be electrode members in the pits by CVD or the like. External power supply 107 is electrically connected to needle-shaped electrodes 105 such that needle-shaped electrodes 105 that are adjacent to needle-shaped electrodes 105 have different polarities. Light is applied obliquely to a direction normal to the light entrance plane of electrode assembly 106 which comprises needle-shaped electrodes 105 that are arrayed in line.

Figure 3:
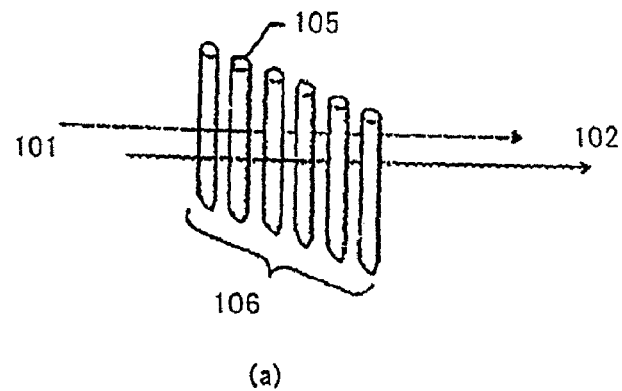
FIG. 3 is a view showing details of an electrode assembly of the optical switch shown in FIG. 2.
Figure 3:
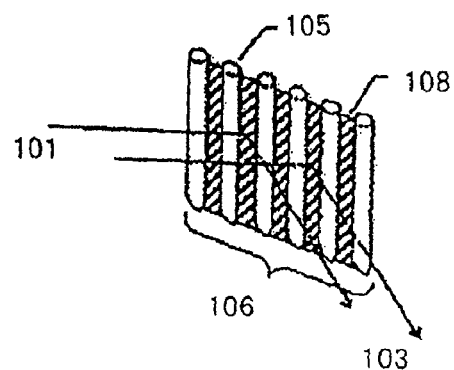

Details of the electrode assembly of the optical switch shown in FIG. 2 will be described below with reference to FIG. 3. When no voltage is applied to electrode assembly 106, electrode assembly 106 causes no refractive index change as shown in FIG. 3(a). Therefore, incident light 101 passes through electrode assembly 106 and is emitted from the optical switch as transmitted light 102. When a voltage is applied to electrode assembly 106, an electric field is generated between needle-shaped electrodes 105 to enable electrode assembly 106 to cause a refractive index change, thereby producing refractive index changing portion 108. Incident light 101 which has an incident angle equal to or greater than the critical angle is reflected by refractive index changing portion 108, and is emitted from the optical switch as reflected light 103.

Electrodes 105 may be made of a transparent material such as ITO (indium tin oxide). If electrodes 105 are made of such a transparent material, then they can inhibit a diffraction which would be caused when the light passes through electrode assembly 106.

According to the arrangement of the present example, needle-shaped electrodes 105 are spaced at relatively small intervals therebetween. Therefore, it is possible to lower the voltage applied to electrode assembly 106 in order to generate an electric field between needle-shaped electrodes 105 to produce refractive index changing portion 108. According to the arrangement of the present example, furthermore, since each of needle-shaped electrodes 105 has a relatively small cross-sectional area and the capacitance of electro-optical crystal 1104 is small, the optical switch can be designed for a low power consumption and high-speed switching operation.

Figure 4:
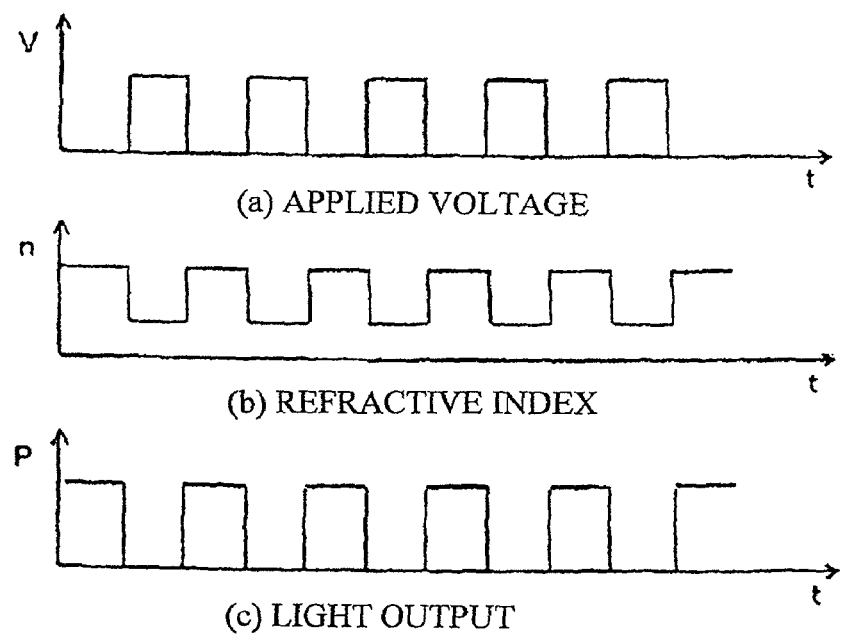
FIG. 4 is a graph illustrative of operation of the optical switch.

Operation of the optical switch according to the present example will be described below with reference to FIGS. 2 through 4.

FIG. 4(a) is a graph showing the waveform of an applied voltage with a horizontal axis representing time and a vertical axis the voltage. FIG. 4(b) is a graph showing a refractive index as it changes depending on the applied voltage with a horizontal axis representing time and a vertical axis the refractive index. FIG. 4(c) is a graph showing the power of light as it changes depending on the applied voltage with a horizontal axis representing time and a vertical axis the power of light which is measured by detecting transmitted light emitted from an electro-optical crystal with a photodetector.

When a voltage is applied to electrode assembly 106 of electro-optical crystal 104, the refractive index of electrode assembly 106 changes to a value smaller than the refractive index of the surrounding region of electro-optical crystal 104. Therefore, incident light 101 which has an incident angle equal to or greater than the critical angle is reflected by electrode assembly 106, and the value of the power of light that is detected by a photodetector (not shown) which is positioned at an exit end where transmitted light 102 exits is lowered. When the voltage applied to electrode assembly 106 is nil, since electrode assembly 106 does not cause a change in the refractive index thereof, the refractive index of electrode assembly 106 is the same as the refractive index of the material of electro-optical crystal 104. Therefore, incident light 101 passes through electrode assembly 106 and is applied to the photodetector positioned at the exit end where transmitted light 102 exits. Accordingly, the value of the power of light detected by the photodetector is increased.

Figure 5:
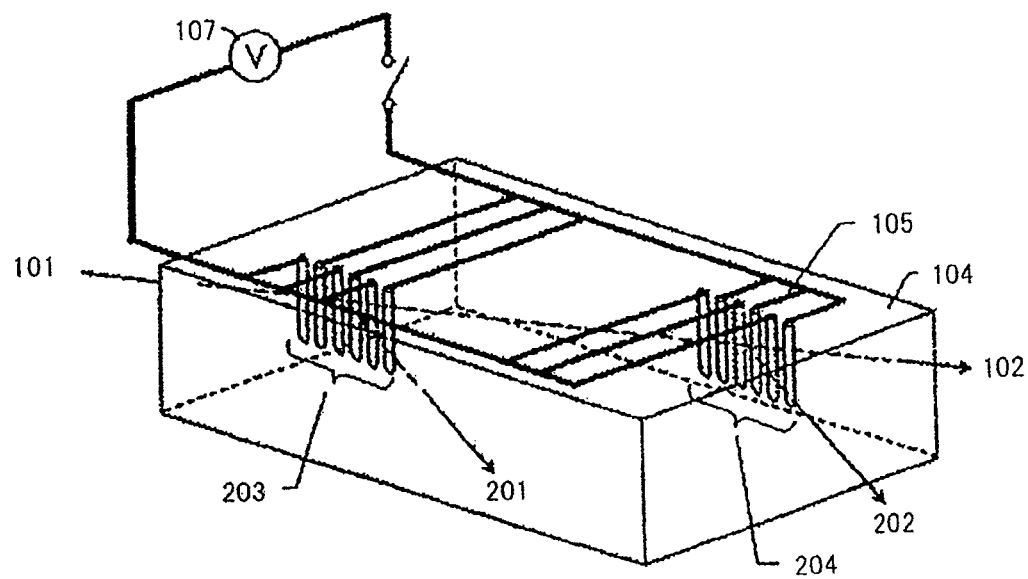
FIG. 5 is a view showing an optical switch having a plurality of electrode assemblies.

FIG. 5 is a view showing an optical switch having a plurality of electrode assemblies. With the arrangement shown in FIG. 5, a plurality of electrode assemblies 106 are arranged on the optical path of incident light 101. The arrangement makes it possible to increase the extinction ratio by reflecting light, which is not reflected by, but is transmitted through, electrode assembly 106 through which incident light 101 passes at first, with another electrode assembly 106 that is positioned behind.

Incident light 101 that is applied to electro-optical crystal 104 with its incident angle being equal to or greater than the critical angle reaches first electrode assembly 106, and is divided thereby into two light components, i.e., transmitted light component 102 and reflected light component 201. Light component 102 which is transmitted through first electrode assembly 106 is divided again into two light components, i.e., transmitted light component 102 and reflected light component 202, by second electrode assembly 204 which is disposed behind first electrode assembly 203. Second reflected light 202 which is reflected by second electrode assembly 204 is emitted from of electro-optical crystal 104, as with first reflected light 201. The extinction ratio can be increased by thus repeatedly reflecting incident light 101.

Figure 6:
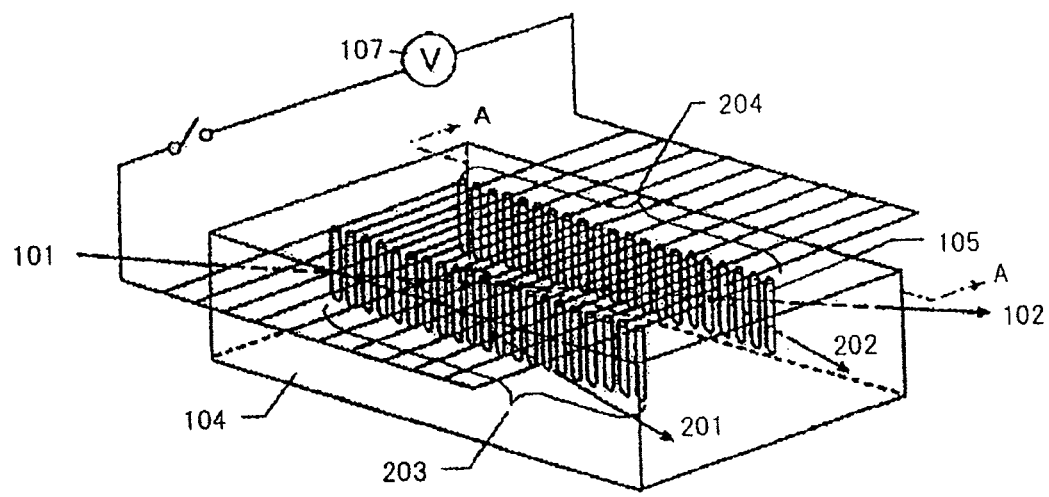
FIG. 6 is a view showing another optical switch having a plurality of electrode assemblies.

As shown in FIG. 6, electro-optical crystal 104 may be of an arrangement wherein first electrode assembly 203 and second electrode assembly 204 are disposed parallel to each other in superposed relation. With this arrangement, unless the incident angle, the beam diameter, the interval between the electrode assemblies, and the length of the refractive index changing portion are of appropriate values, second reflected light 202 may be applied to first electrode assembly 203, possibly adversely affecting the switching operation thereby to lower the extinction ratio.

Figure 7:
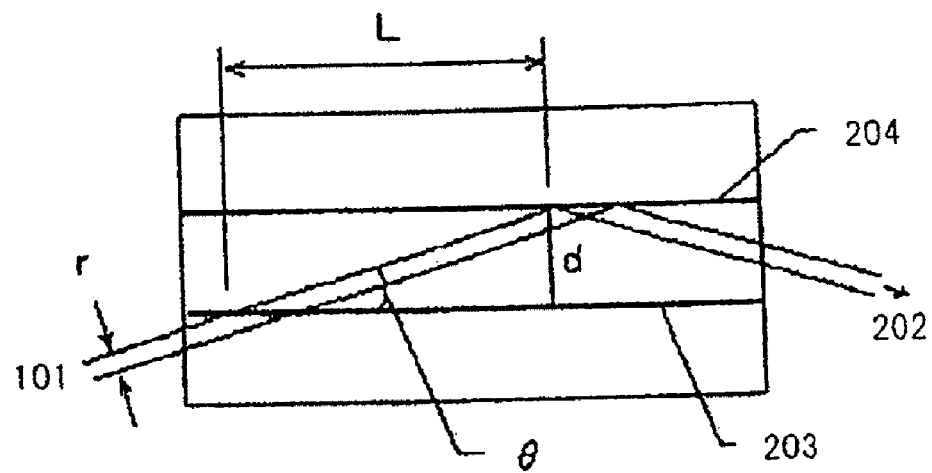
FIG. 7 is a cross-sectional view taken along line A-A of the arrangement shown in FIG. 6.

FIG. 7 is a cross-sectional view taken along line A-A of the arrangement shown in FIG. 6. It is assumed that the incident angle of incident light 101 is represented by θ, the length of one-half of the refractive index changing portion by L, the interval between first electrode assembly 203 and second electrode assembly 204 by d, and the beam diameter by r. In order to prevent second reflected light 202 from being applied to first electrode assembly 203, the following equations (3), (4) need to be satisfied:

$$L < d/\tan\theta \tag{3}$$

$$L > \tfrac{1}{2}(d/\tan\theta + r/\sin\theta) \tag{4}$$

If the interval between electrode assemblies 203, 204 is small, then an electric field is generated between the electrode assemblies, producing an unexpected refractive index changing portion between electrode assemblies. As a result, it is possible that an appropriate extinction ratio may not be obtained due to an expected scattering of light. The interval between electrode assemblies 203, 204 should be at least three times the distance between electrodes 105.

Figure 8:
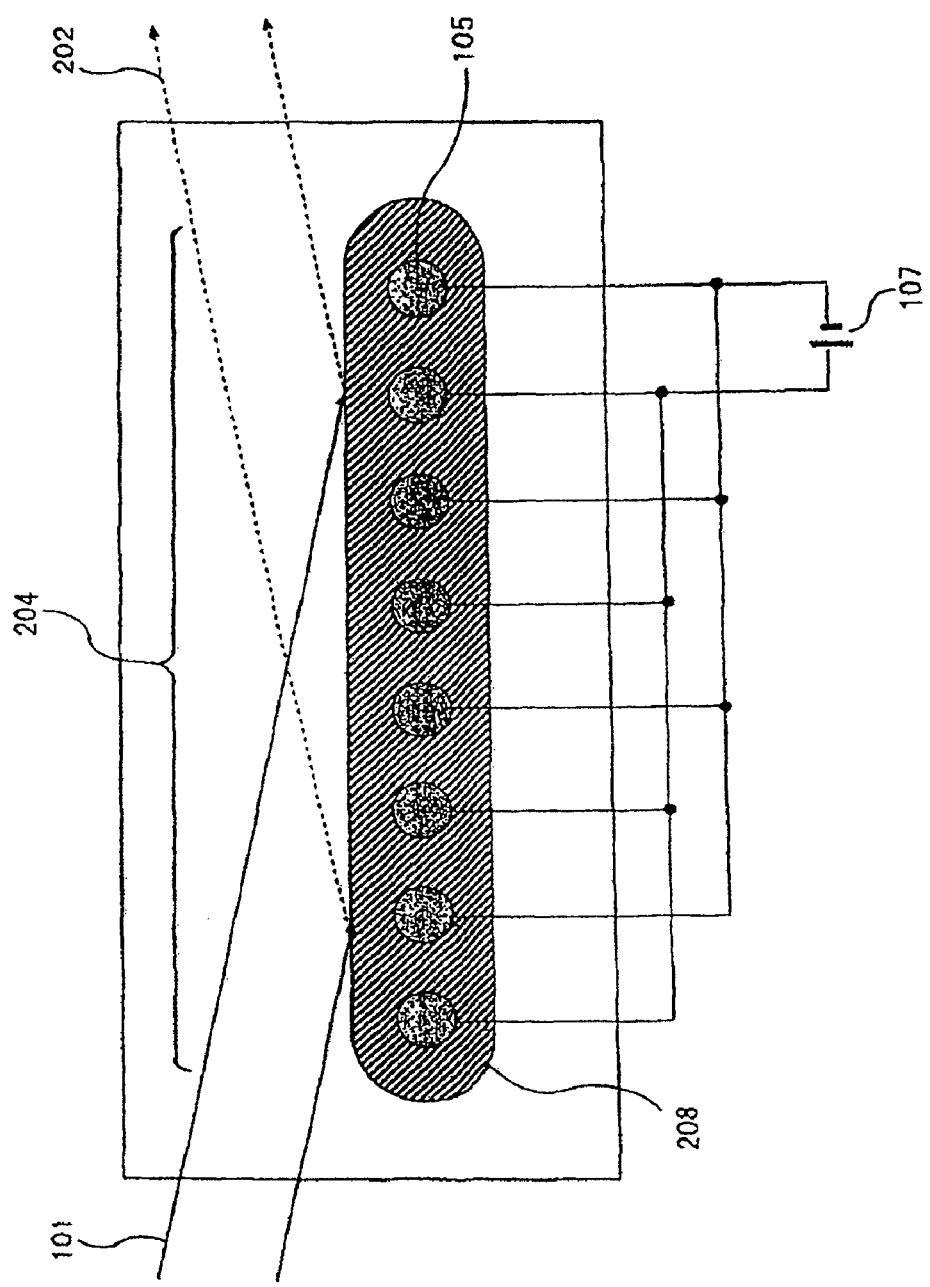
FIG. 8 is a view showing a refractive index changing portion that is produced when a voltage is applied to the electrode assembly.

With the multiple-type arrangements having a plurality of electrode assemblies 203, 204 as shown in FIGS. 6 and 7, furthermore, if light is scattered by a refractive index changing portion which is produced when a voltage is applied to latter electrode assembly 204, it is possible that an appropriate extinction ratio may not be obtained due to the scattered light. Consequently, it is desirable to prevent the scattering of light caused by the refractive index changing portion. Specifically, as shown in FIG. 8, refractive index changing portion 208 which is produced so as to enclose a plurality of electrodes 105 when a voltage is applied to electrode assembly 204 should preferably have a flat refractive index boundary. The flat refractive index boundary of refractive index changing portion 208 does not scatter, but causes reflected light 202 reflected thereby to travel in essentially the same direction. Accordingly, the light reflected by refractive index changing portion 208 at latter electrode assembly 204 is prevented from affecting the switching operation of former electrode assembly 204. Refractive index changing portion 208 shown in FIG. 8 is applicable not only to the multiple-type optical switches shown in FIGS. 6, 7, but also to the optical switches shown in FIGS. 2, 5.

Second Example

A second example of the present invention will be described below with reference to FIG. 9, etc. According to the present example, a plurality of slot-shaped electrodes 109 are formed parallel to each other by depositing an electron conductor which can be electrode members on an upper surface of first electro-optical crystal 205 by evaporation or the like. The surface of first electro-optical crystal 205 in which slot-shaped electrodes 109 are formed is polished to a flat finish. Second electro-optical crystal 206 is joined to the polished surface of first electro-optical crystal 205 by intermolecular forces. External power supply 107 is electrically connected to slot-shaped electrodes 109 such that slot-shaped electrodes 109 that are adjacent to slot-shaped electrodes 109 have different polarities, providing electrode assembly 106. Electrode assembly 106 is sandwiched between and disposed in two electro-optical crystals 205, 206. Two electro-optical crystals 205, 206 may be joined to each other by a binder having an equivalent refractive index with electrode assembly 106 embedded therein.

Figure 9:
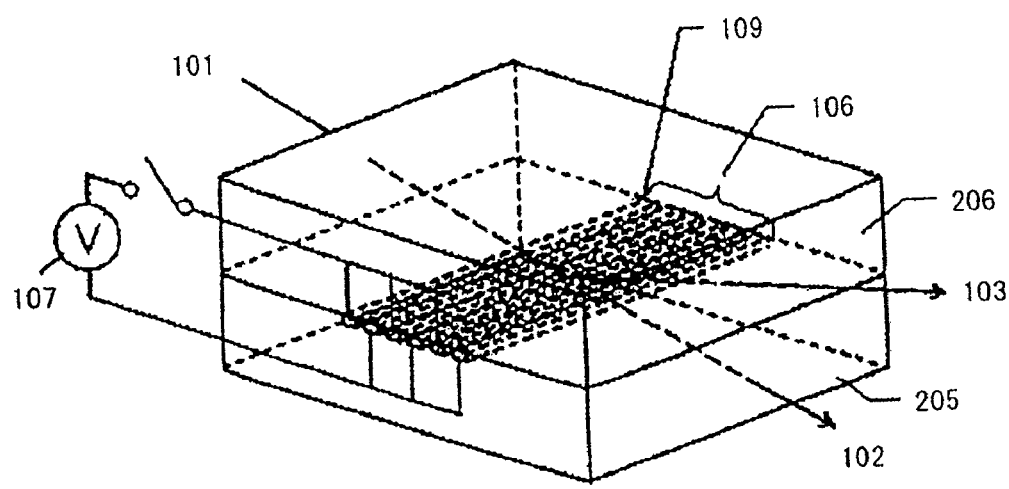
FIG. 9 is a view showing an optical switch according to a second example of the present invention.
Figure 10:
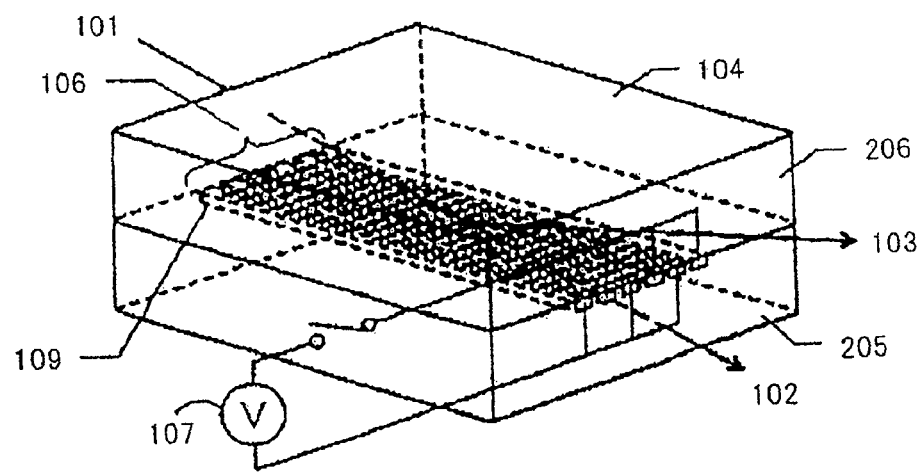
FIG. 10 is a view showing another optical switch according to the second example of the present invention.

With the arrangement shown in FIG. 9, slot-shaped electrodes 109 are disposed such that the direction in which incident light 101 travels and the longitudinal direction of slot-shaped electrodes 109 cross each other. However, as shown in FIG. 10, slot-shaped electrodes 109 may be disposed such that the direction in which incident light 101 travels and the longitudinal direction of slot-shaped electrodes 109 are the same as each other.

Slot-shaped electrodes 109 are spaced at relatively small intervals, each of slot-shaped electrodes 109 has a relatively small cross-sectional area, and the capacitance of electro-optical crystals 205, 206 is small, as is the case with the first example.

Figure 11:
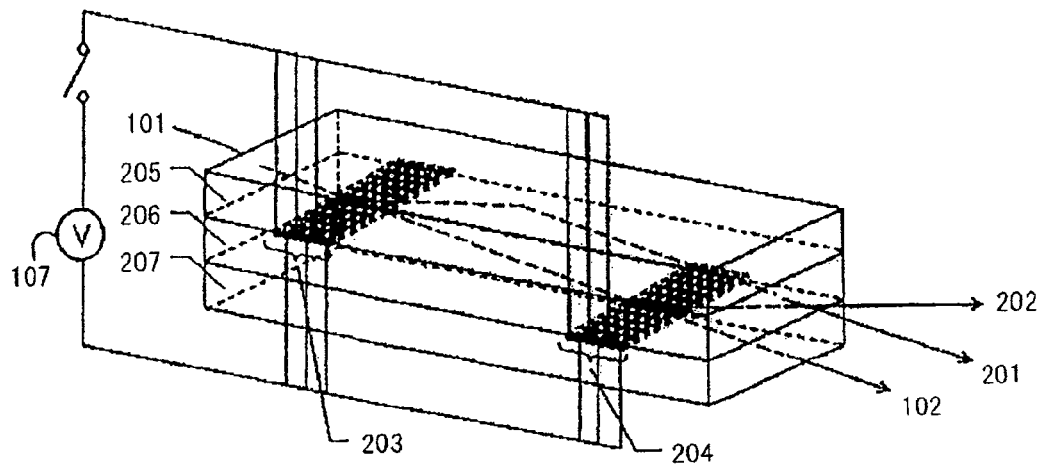
FIG. 11 is a view showing an optical switch having a plurality of electrode assemblies.

According to the present example, as with the first example, a plurality of electrode assemblies 106 may be provided in electro-optical crystal 104 for reflecting the incident light a plurality of times for an increased extinction ratio. An optical switch having a plurality of electrode assemblies 106 according to the present example is shown in FIG. 11.

A plurality of slots are formed on one side surface of first electro-optical crystal 205 by etching or the like, and a layer comprising an electron conductor which can be electrode members is deposited over the surface by evaporation or the like. The surface of first electro-optical crystal 205 on which the electron conductor has been evaporated is polished to a flat finish by CMP or the like. Then, the electron conductor is removed from an area other than the slots, thereby forming first electrode assembly 203 comprising a plurality of slot-shaped electrodes 109. Alternatively, the area other than the slots may be masked by a masking member, and then a layer comprising an electron conductor which can be electrode members is deposited over the surface. Thereafter, the masking member may be removed, and the surface with the electrodes formed therein may be polished to a flat finish by CMP or the like. Second electro-optical crystal 206 which has second electrode assembly 204 that has been formed in the same manner as with first electrode assembly 203 is joined to the same surface as first electrode assembly 203 by intermolecular forces. As shown in FIG. 11, electro-optical crystals 205, 206 have first electrode assembly 203 and second electrode assembly 204 positioned on the optical path. Third electro-optical crystal 207 is joined to the surface of second electro-optical crystal 206 in which second electrode assembly 204 is formed by intermolecular forces. In this manner, a multiple-type optical switch which has a plurality of electrode assemblies 203, 204 is constructed.

Figure 12:
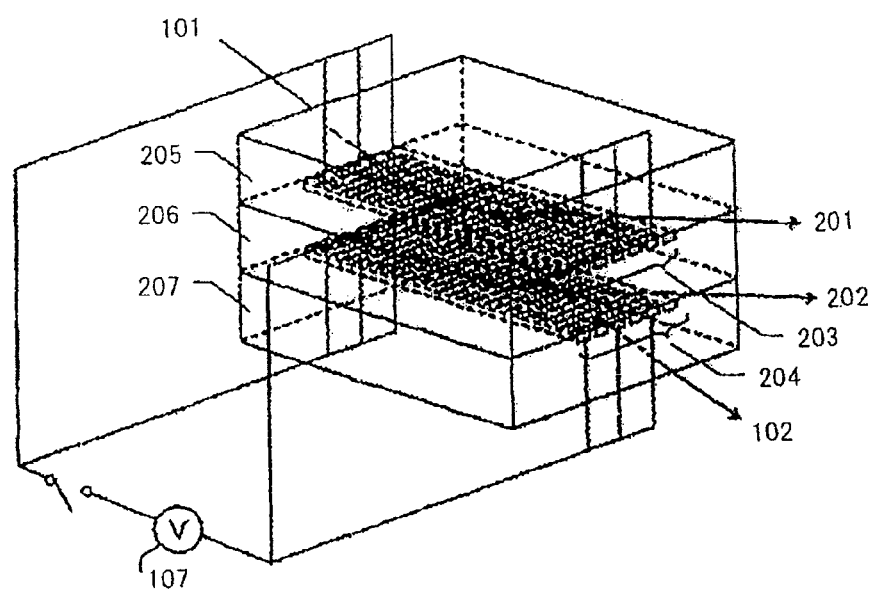
FIG. 12 is a view showing another optical switch having a plurality of electrode assemblies.

FIG. 12 shows a multiple-type optical switch having a plurality of slot-shaped electrodes 109 arranged such that the direction in which incident light 101 travels and the longitudinal direction of slot-shaped electrodes 109 are the same as each other. The optical switch shown in FIG. 12 can be fabricated in the same process as with the optical switch having plural slot-shaped electrodes 109 arranged such that the direction in which incident light 101 travels and the longitudinal direction of slot-shaped electrodes 109 cross each other, as shown in FIG. 11. However, for the same reasons as described for the arrangement shown in FIG. 6, the incident angle, the beam diameter, the interval between the electrode assemblies, and the length of the refractive index changing portion need to satisfy equations (3), (4).

Third Example

A third example of the present invention will be described below with reference to FIG. 13, etc.

Figure 13:
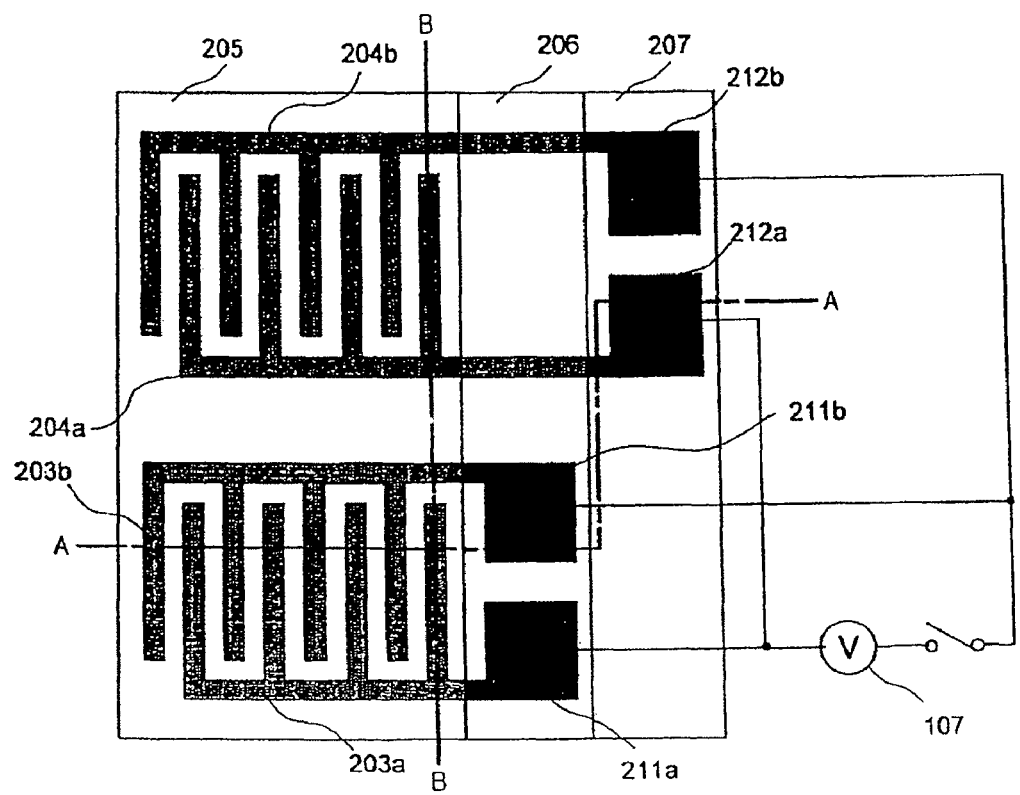
FIG. 13 is a plan view of an optical switch according to a third example of the present invention.
Figure 14:
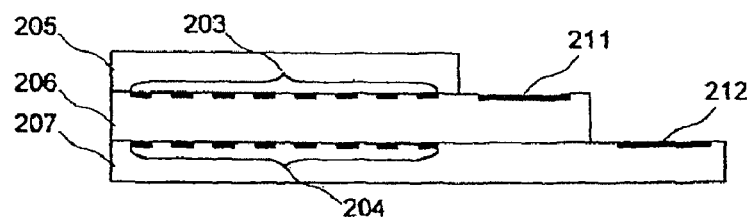
FIG. 14 is a cross-sectional view taken along line A-A of FIG. 13.

FIG. 13 is a plan view of an optical switch according to the third example of the present invention, and FIG. 14 is a cross-sectional view taken along line A-A of FIG. 13.

As shown in FIGS. 13, 14, the optical switch has a stacked structure of optical crystal plate 205, optical crystal plate 206 having electrode assemblies 203a, 203b disposed on a surface thereof, and optical crystal plate 207 having electrode assemblies 204a, 204b disposed on a surface thereof. Optical crystal plates 205 through 207 comprise a crystal having an electro-optical effect (electro-optical crystal).

Each of electrode assemblies 203a, 203b comprises a comb-shaped electrode assembly having a plurality of linear electrodes spaced at equal intervals and having main cross sections of maximum areas disposed in one plane. Electrode assembly 203a and electrode assembly 203b have respective linear electrodes alternately disposed and spaced at equal intervals. Each of electrode assemblies 204a, 204b also comprises a comb-shaped electrode assembly and has linear electrodes alternately disposed. The linear electrodes of electrode assemblies 204a, 204b are spaced at equal intervals which are the same as the intervals between the linear electrodes of electrode assemblies 203a, 203b. The equal intervals between the linear electrodes mean that the distances between the linear electrodes are in full agreement with each other and also the intervals between the linear electrodes are different from each other due to manufacturing errors or the like.

Optical crystal plate 205 is applied to the surface of optical crystal plate 206 to cover the area in which the linear electrodes corresponding to the comb teeth of electrode assemblies 203a, 203b are disposed. Optical crystal plate 206, to which optical crystal plate 205 is applied, is applied to the surface of optical crystal plate 207 to cover the area in which the linear electrodes corresponding to the comb teeth of electrode assemblies 204a, 204b are disposed.

FIG. 13 shows electrode assemblies 203a, 203b on the surface of optical crystal plate 206 in perspective as seen from optical crystal plate 205. A first electrode forming area which comprises electrode assemblies 203a, 203b is formed in a position that is slightly displaced from a second electrode forming area which comprises electrode assemblies 204a, 204b. However, as shown in FIG. 14, if the optical switch is viewed in a direction perpendicular to a cross section of optical crystal plates 205 through 206 along line A-A of FIG. 13, then the linear electrodes of electrode assemblies 203a, 203b and the linear electrodes of electrode assemblies 204a, 204b are positionally aligned with each other.

The first electrode forming area which comprises electrode assemblies 203a, 203b and the second electrode forming area which comprises electrode assemblies 204a, 204b are disposed successively along the direction in which the incident light travels. In other words, the first electrode forming area and the second electrode forming area are positioned on the optical path. If the first and second electrode forming areas are viewed along the direction in which the incident light travels, then the first and second electrode forming areas are stacked such that electrode planes of plural linear electrodes of the electrode assemblies of the areas (or planes in which the electrode assemblies are disposed) extend parallel to each other. If the first and second electrode forming areas are viewed along the direction in which the incident light travels, then the linear electrodes of electrode assemblies 203a, 203b and the linear electrodes of electrode assemblies 204a, 204b are positionally aligned with each other.

The optical switch is formed by bonding optical crystal plates 205 through 207 shown in FIGS. 13, 14 at a high temperature under a high pressure. Optical crystal plates 205 through 207 that are bonded at a high temperature under a high pressure can be regarded as a single optical crystal (specifically, an electro-optical crystal). In other words, an electro-optical crystal with electrode assemblies disposed therein can be formed by bonding optical crystal plates 205 through 207 at a high temperature under a high pressure.

With this optical switch, when a voltage is applied between electrode assemblies 203a, 203b, the refractive index of the crystal in the vicinity of the electrodes including electrode assemblies 203a, 203b changes due to the electro-optical effect. Similarly, when a voltage is applied between electrode assemblies 204a, 204b, the refractive index of the crystal in the vicinity of the electrodes including electrode assemblies 204a, 204b changes due to the electro-optical effect.

With the optical switch according to the present example, incident light is reflected by the boundary of a first refractive index changing region that is produced when a voltage is applied between electrode assemblies 203a, 203b, and light that has been transmitted through the first refractive index changing region is reflected by the boundary of a second refractive index changing region that is produced when a voltage is applied between electrode assemblies 204a, 204b. It is thus possible to attain a high extinction ratio. The extinction ratio can further be improved by using three or more electrode assemblies (refractive index changing regions) disposed along the direction in which the incident light travels. However, since the increased number of refractive index changing regions results in an increased number of electrodes and an increase in the capacitance, the increased number of refractive index changing regions is not desirable from the standpoint of more power saving and smaller size. The number of refractive index changing regions should desirably be determined in view of the relationship between the extinction ratio and more power saving and smaller size.

Diffraction occurs when the incident light passes between the linear electrodes of electrode assemblies 203a, 203b. If primary diffracted light is used as output light in addition to the light that has passed between the linear electrodes of electrode assemblies 203a, 203b, then the efficiency with which to utilize light is increased. If the linear electrodes are made of semitransparent or opaque electrode materials and also if the interval between electrode assemblies 203a, 203b and the interval between electrode assemblies 204a, 204b are not appropriate in the thicknesswise direction of the optical crystal plates, then the primary diffracted light from electrode assemblies 203a, 203b is blocked by the linear electrodes of electrode assemblies 204a, 204b. As a result, the efficiency with which to utilize light is lowered, and the extinction ratio is lowered accordingly.

Figure 15:
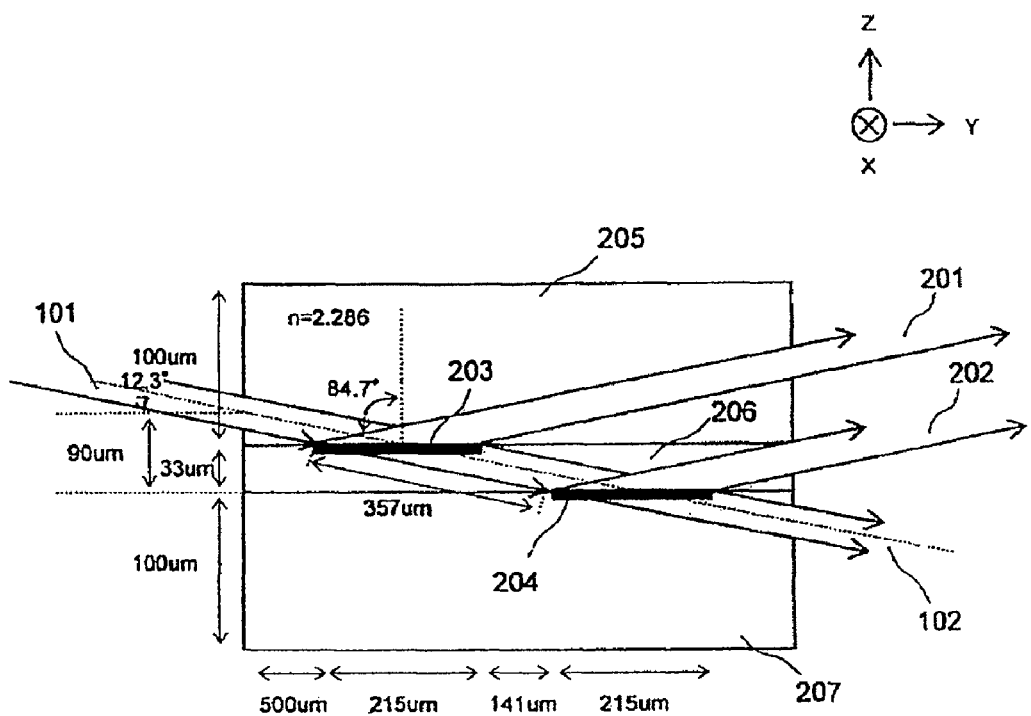
FIG. 15 is a schematic view showing a more specific structure of the optical switch according to the third example.

FIG. 15 is a schematic view showing a more specific structure of the optical switch according to the third example. FIG. 15 schematically shows a partial cross section along line B-B of the optical switch shown in FIG. 13.

Optical crystal plates 205 through 207 comprise an electro-optical crystal (lithium niobate: LiNbO$_3$) having a refractive index n of about 2.286. When a voltage of 200 V is applied between the linear electrodes by external power supply 107 (see FIG. 13), the refractive index of the electro-optical crystal changes by Δn of −0.01. The thicknesses of optical crystal plates 205 through 207 can be set to desired values. In the present example, both optical crystal plates 205, 207 have a thickness of 100 μm, and optical crystal plate 205 has a thickness of 33 μm.

The incident light has a wavelength λ of 460 mm and a beam diameter Db of 20 μm. The linear electrodes of electrode assemblies 203, 204 are spaced at an interval Sx of 3 μm and each have a width Ew of 3 μm. Electrode assemblies 203, 204 each have a thickness of 500 mm.

Based on the above values, conditions for achieving a high light utilization efficiency and minimizing the interval Sz in the Z-axis direction between the linear electrodes of first electrode assembly 203 and the corresponding linear electrodes of second electrode assembly 204 are as follows:

The critical angle θm at the time the incident light is totally reflected by the refractive index boundary of the refractive index changing portion boundary of the electro-optical crystal whose refractive index changes upon application of an electric field is 84.7°, the incident angle of the incident light applied to the electro-optical crystal is 12.3°, and the incident position is a position having a height of 90 μm from electrode assembly 204. The linear electrodes of electrode assemblies 203, 204 have an electrode length El of 215 μm. The electrode length El may be greater than 215 μm.

A primary diffraction angle θd is 3.8°. The interval Sy in the Y-axis direction between the first electrode assembly 203 and second electrode assembly 204 is 141 μm. The optical path for the transmitted light between electrode assemblies 203, 204 has a length L1 of 357 μm.

With the optical switch satisfying the above conditions, transmitted light and primary diffracted light from electrode assembly 203 necessarily travels between the linear electrodes of electrode assembly 204. Therefore, the primary diffracted light can be utilized as output light in addition to the transmitted light. As a result, light utilization efficiency is increased, and the extinction ratio is improved.

[Process of Forming Electrodes]

A process of forming electrodes for producing a structure in which a plurality of electrode assemblies are arranged in a given direction within an optical crystal plate will be described below.

FIGS. 16(a) through (i) are cross-sectional views showing a procedure of a process of forming electrodes of an optical switch.

First, the surface of electro-optical crystal 290 is coated with resist 291 (step shown in FIG. 16(a)). Then, the surface coated with resist 291 is masked by mask 292 having an electrode pattern, and exposed to light (step shown in FIG. 16(b)). Then, the exposed areas of resist 291 are removed (step shown in FIG. 16(c)).

Figure 16:
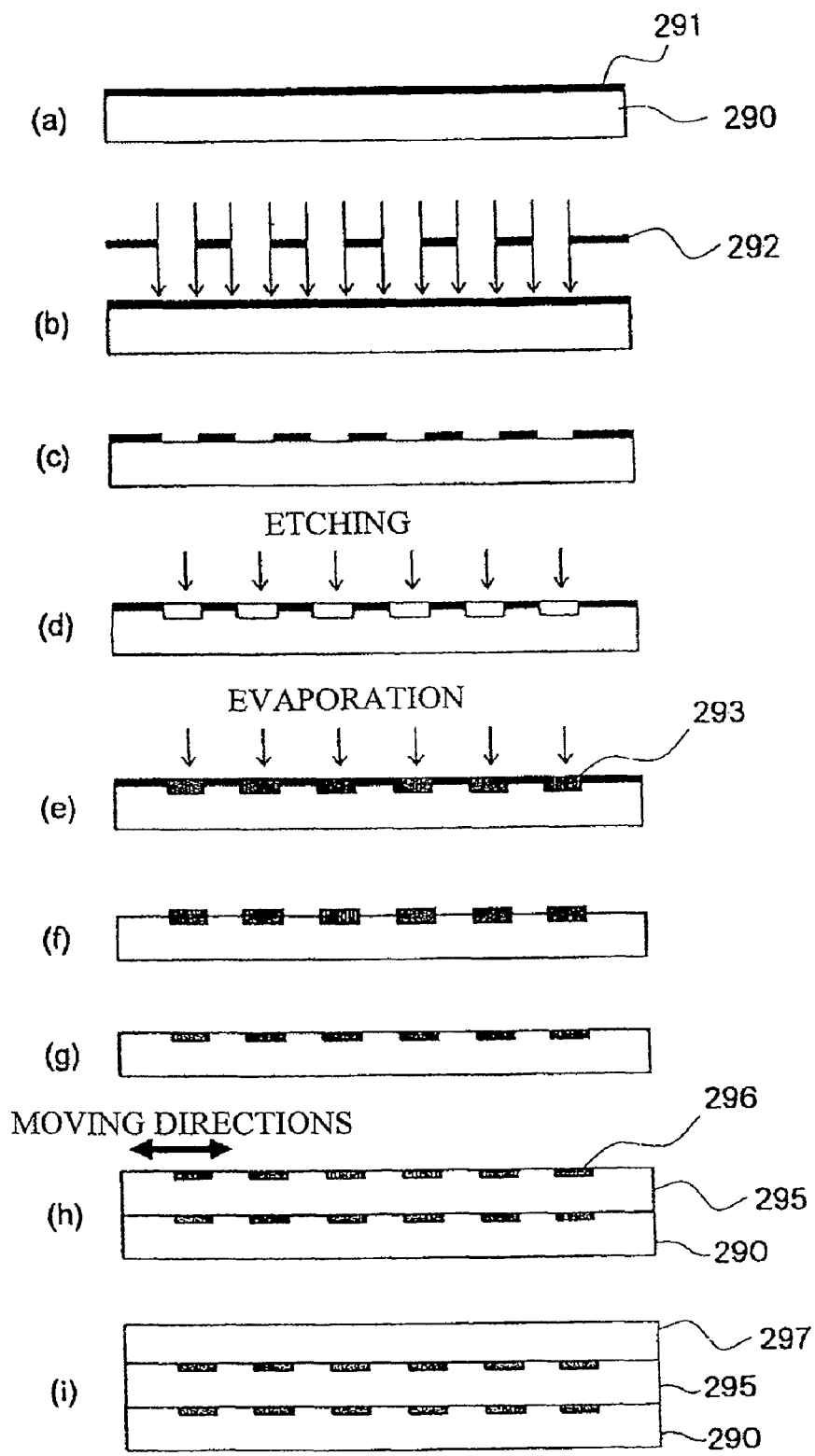
FIG. 16 is a cross-sectional view showing a procedure of a process of forming electrodes of an optical switch.

Then, using resist 291, from which the exposed areas have been removed, as a mask, the exposed surface areas of electro-optical crystal 290 is etched (step shown in FIG. 16(*d*)) by an etching material comprising fluorinated oxygen or the like.

Then, an electrode material (gold, aluminum, platinum, or the like) is deposited on the etched areas of electro-optical crystal 290, producing electrodes 293 (step shown in FIG. 16(*e*)). Thereafter, the resist 291 is removed (step shown in FIG. 16(*f*)). Then, the surface of electro-optical crystal 290 and the surfaces of electrodes 293 are polished to the same height (step shown in FIG. 16(*g*)).

Then, electro-optical crystal 290 and electro-optical crystal 295 which have electrodes 296 formed according to the steps shown in FIGS. 16(*a*) through 16(*g*) are positionally adjusted by moving the surface of electro-optical crystal 290 in which electrodes 293 are formed and the surface of electro-optical crystal 295 which is opposite to the surface thereof in which electrodes 296 are formed, along moving directions. Thereafter, electro-optical crystals 290, 295 are bonded to each other by holding their surfaces in close contact with each other at a high temperature under a high pressure (step shown in FIG. 16(*h*)). In the bonding step, it is assumed that the surfaces to be bonded of electro-optical crystals 290, 295 have been processed into surfaces of sufficient planarity.

Finally, electro-optical crystals 295, 297 are bonded to each other by holding the surface of electro-optical crystal 295 in which electrodes 296 are formed and a surface of electro-optical crystal 297 in close contact with each other at a high temperature under a high pressure (step shown in FIG. 16(*i*)). In the bonding step, it is assumed that the surfaces to be bonded of electro-optical crystals 295, 297 have been processed into surfaces having sufficient planarity.

By applying the steps shown in FIGS. 16(*a*) through 16(*i*), electrode assemblies 203*a*, 203*b*; 204*a*, 204*b* can be formed in optical crystal plates 205, 207 shown in FIGS. 13, 14 and optical crystal plates 205 through 207 can be bonded together.

As described above, the formation of web-shaped electrodes can easily be achieved.

The optical switch according to the present invention can be applied to optical communication apparatus, image display apparatus, image forming apparatus, etc. An image display apparatus and an image forming apparatus, as examples to which the optical switch is applied, will be described below.

[Image Display Apparatus]

The arrangement of an image display apparatus incorporating optical switches according to the present invention will be described below.

Figure 17:
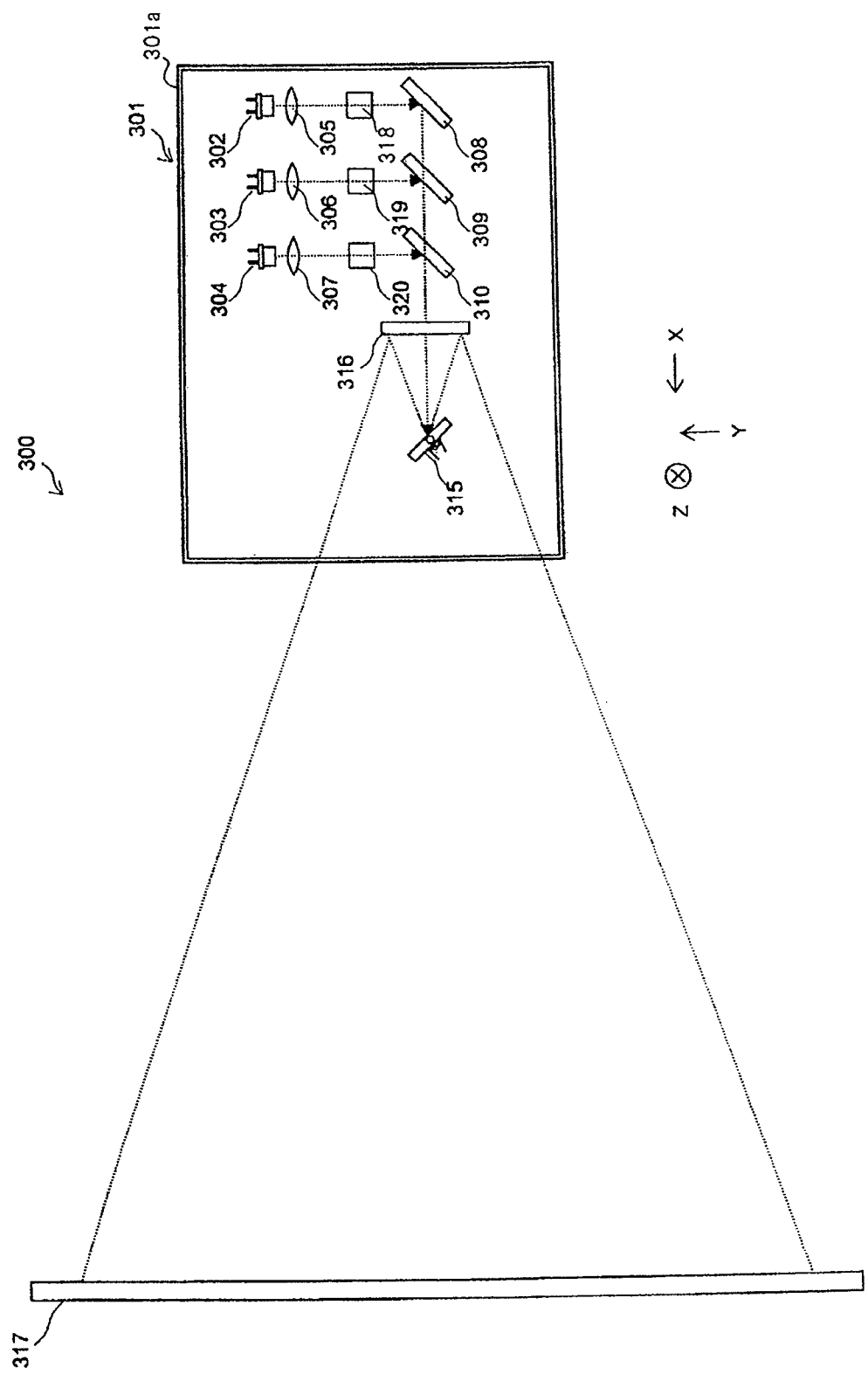
FIG. 17 is a schematic view showing an example of an image display apparatus.

FIG. 17 is a schematic view showing an example of an image display apparatus. Image display apparatus 300 shown in FIG. 17 includes image projection device 301 and screen 317.

Image projection device 301 has casing 301*a* housing therein laser beam sources 302, 303, 304, collimator lenses 305, 306, 307, reflecting mirror 308, dichroic mirrors 309, 310, horizontal scanning mirror 315, vertical scanning mirror 316, and optical switches 318, 319, 320. Optical switches 318, 319, 320 comprise optical switches according to the present invention.

Collimator lens 305, optical switch 318, and reflecting mirror 308 are successively disposed along the direction in which a laser beam from laser beam source 302 travels. A parallel beam from collimator lens 305 is applied to optical switch 318, which operates in response to a control signal supplied from a controller, not shown. During a period in which the control signal is ON (voltage supply period), a voltage is applied to the electrode assembly of optical switch 118, producing a refractive index changing region therein. The refractive index changing region reflects the incident light off the optical path toward reflecting mirror 308. During a period in which the control signal is OFF (voltage supply stop period), the incident light is transmitted through optical switch 318 toward reflecting mirror 308.

Collimator lens 306, optical switch 319, and dichroic mirror 309 are successively disposed along the direction in which a laser beam from laser beam source 303 travels. A parallel beam from collimator lens 306 is applied to optical switch 319, which operates in the same manner as optical switch 318. During a period in which the control signal is ON (voltage supply period), the refractive index changing region reflects the incident light off the optical path toward dichroic mirror 309. During a period in which the control signal is OFF (voltage supply stop period), the incident light is transmitted through optical switch 319 toward dichroic mirror 309.

Collimator lens 307, optical switch 320, and dichroic mirror 310 are successively disposed along the direction in which a laser beam from laser beam source 304 travels. A parallel beam from collimator lens 307 is applied to optical switch 320, which operates in the same manner as optical switch 318. During a period in which the control signal is ON (voltage supply period), the refractive index changing region reflects the incident light off the optical path toward dichroic mirror 310. During a period in which the control signal is OFF (voltage supply stop period), the incident light is transmitted through optical switch 320 toward dichroic mirror 310.

Dichroic mirror 309 is disposed in a position where the light beam from optical switch 319 and the light beam reflected by reflecting mirror 308 cross each other. Dichroic mirror 309 has a wavelength selecting characteristic which reflects the light from optical switch 319 and transmits the light from reflecting mirror 308.

Dichroic mirror 310 is disposed in a position where the light beam from optical switch 320 and the light beam reflected by dichroic mirror 309 cross each other. Dichroic mirror 309 has a wavelength selecting characteristic which reflects the light from optical switch 320 and transmits the light from dichroic mirror 309.

Horizontal scanning mirror 315 is disposed in the direction in which the light beam from dichroic mirror 310 travels, and whose operation is controlled by a horizontal scanning control signal from the non-illustrated controller.

Laser beam sources 302, 303, 304 comprise respective light sources for emitting laser beams having colors that correspond to the three primaries of red (R: 620 nm), green (G: 530 nm), and blue (B: 470 nm). By turning on and off optical switches 318, 319, 320 and also by controlling horizontal scanning mirror 315 and vertical scanning mirror 316, it is possible to display color images on screen 317.

[Image Forming Apparatus]

The arrangement of an image forming apparatus incorporating an optical switch according to the present invention will be described below.

Figure 18:
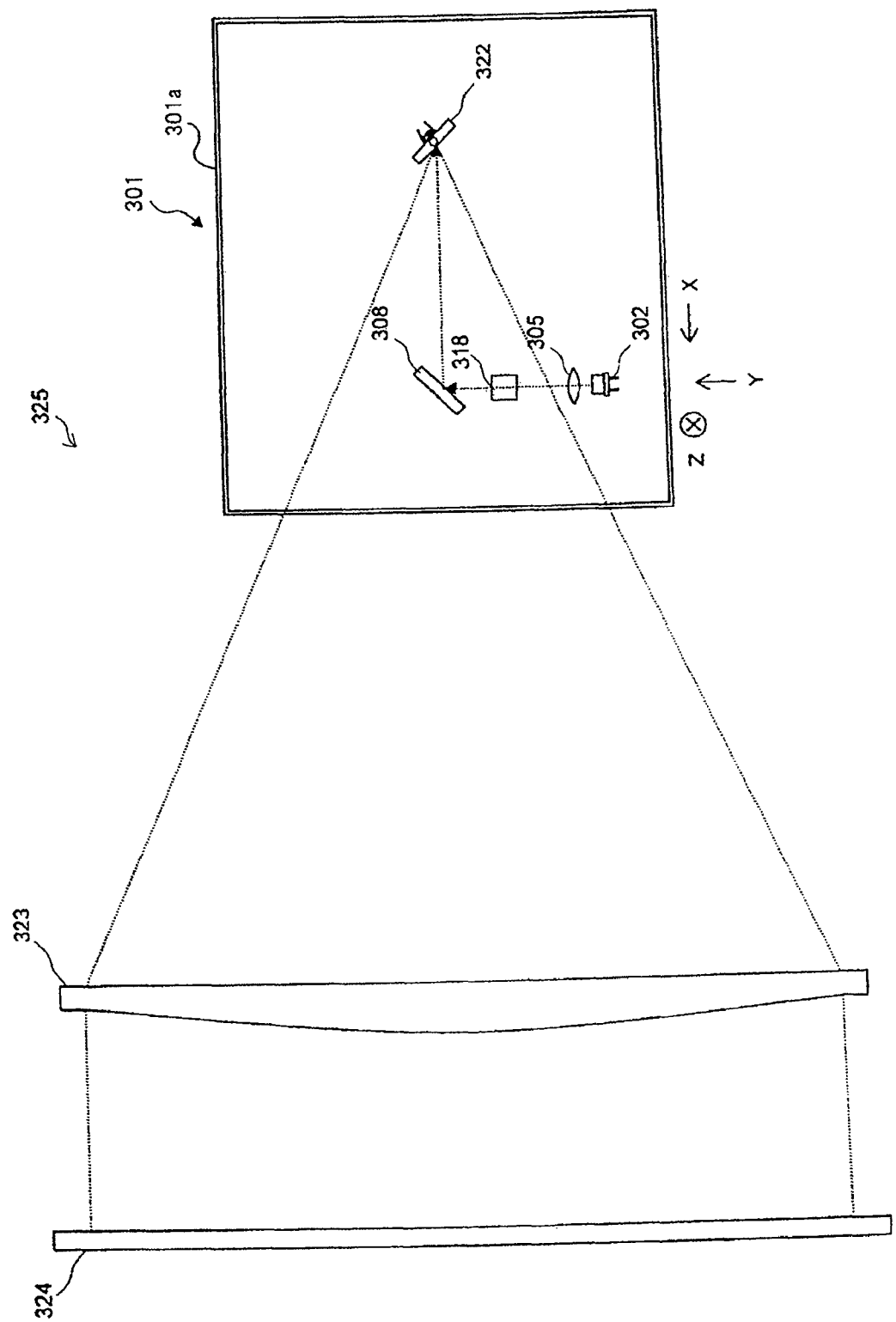
FIG. 18 is a schematic view showing an example of an image forming apparatus.

FIG. 18 is a schematic view showing an example of an image forming apparatus. The image forming apparatus includes image projection device 301, fθ lens 323, and photosensitive body 324. Image projection device 301 has casing 301*a* housing therein laser beam source 302, collimator lens 305, reflecting mirror 308, scanning mirror 322, and optical switch 318. Optical switch 318 comprises an optical switch according to the present invention.

Collimator lens 305, optical switch 318, and reflecting mirror 308 are successively disposed along the direction in which a laser beam (e.g., a red laser beam having a wavelength of 620 nm) from laser beam source 302 travels. A parallel beam from collimator lens 305 is applied to optical switch 318, which operates in response to a control signal supplied from a controller, not shown. During a period in which the control signal is ON (voltage supply period), a voltage is applied to the electrode assembly of optical switch 118, producing a refractive index changing region therein. The refractive index changing region reflects the incident light off the optical path toward reflecting mirror 308. During a period in which the control signal is OFF (voltage supply stop period), the incident light is transmitted through optical switch 318 toward reflecting mirror 308.

Scanning mirror 322 is disposed in the direction in which the light beam from reflecting mirror 308 travels, and is controlled in operation by a scanning control signal from the non-illustrated controller. The light from scanning mirror 322 is applied through fθ lens 323 to photosensitive body 324.

By turning on and off optical switch 318 and also by controlling scanning mirror 322, it is possible to form images on photosensitive body 324.

A prototype optical switch will be described below with reference to FIG. 19. First, two pits having a diameter of about 10 μm and a depth of about 100 μm and spaced from each other by a distance of 100 μm are formed by etching in the surface of electro-optical crystal 104 having a width of 5 mm, a depth of 5 mm, and a thickness of 1 mm. Then, aluminum is deposited on the surface by CVD, forming two needle-shaped electrodes 105 extending into electro-optical crystal 104. External power supply 107 is connected to needle-shaped electrodes 105 such that two needle-shaped electrodes 105 have different polarities, thereby producing single-type optical switch 112 as a prototype. When a voltage applied from external power supply 107 to needle-shaped electrodes 105 is changed, optical switch 112 causes electrode assembly 106 of two needle-shaped electrodes 105 to change its refractive index.

A light source comprising a laser beam source is placed such that light beam 101 emitted from the light source, which has a beam diameter of 20 μm, passes between two needle-shaped electrodes 105. At this time, the laser beam is applied at an incident angle equal to or greater than the critical angle to the boundary of a refractive index changing portion that is generated by electrode assembly 106 of two needle-shaped electrodes 105.

When the voltage is not applied, since electrode assembly 106 does not change the refractive index, the laser beam travels straight, and is emitted as transmitted light 102 from electro-optical crystal 104. When the voltage is applied, since electrode assembly 106 changes the refractive index and reflects the laser beam, reflected light 103 is emitted from electro-optical crystal 104 at a position that is different from the position where transmitted light 102 is emitted from electro-optical crystal 104. A photodetector (not shown) is disposed at the position where transmitted light 102 is emitted, and detects the power of light as a voltage. Reflected light 103 is emitted from electro-optical crystal 104 off the position where the photodetector is disposed, and hence is not detected by the photodetector. The power of transmitted light 102 at the time that external power supply 107 applies the voltage and the power of transmitted light 102 at the time that external power supply 107 does not apply the voltage are measured by the photodetector, and an extinction ratio is calculated.

Figure 19:
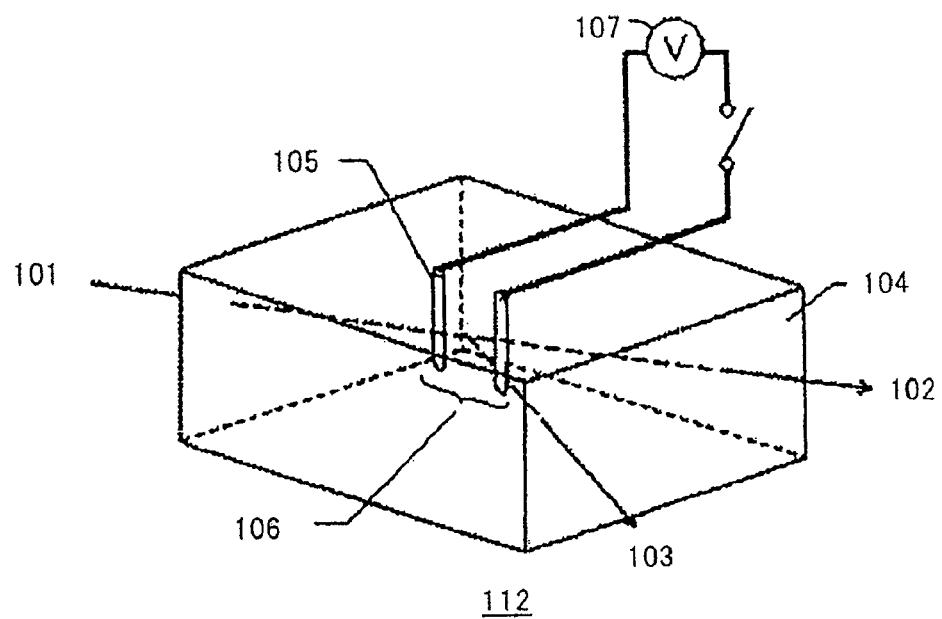
FIG. 19 is a view showing a prototype optical switch.
Figure 20:
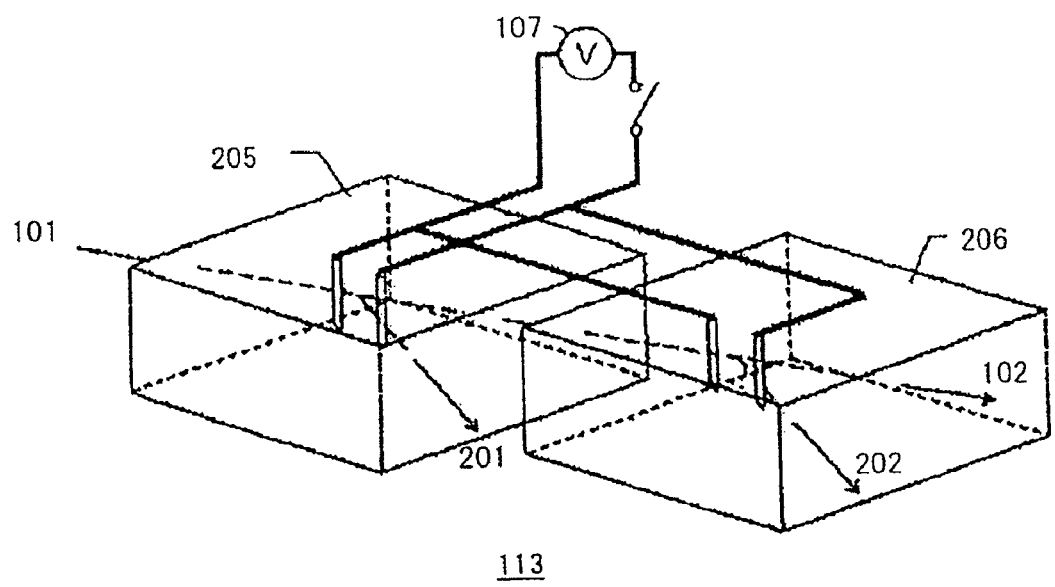
FIG. 20 is a view showing another prototype optical switch.

FIG. 20 is a view showing multiple-type optical switch 113 which comprises two single-type optical switches 112 shown in FIG. 19 that are disposed on the same optical path. Two single-type optical switches 112 are disposed adjacent to each other at a spacing of about 1 mm therebetween. The laser beam is applied at an incident angle equal to or greater than the critical angle to the boundary of a refractive index changing portion that is generated by electrode assembly 106 of each of the optical switches. Each of two single-type optical switches 112 that are disposed on the optical path for the laser beam reflects incident light 101. A photodetector (not shown) is disposed at the position where transmitted light 102 is emitted, and measures the power of detected light as a voltage.

Figure 1:
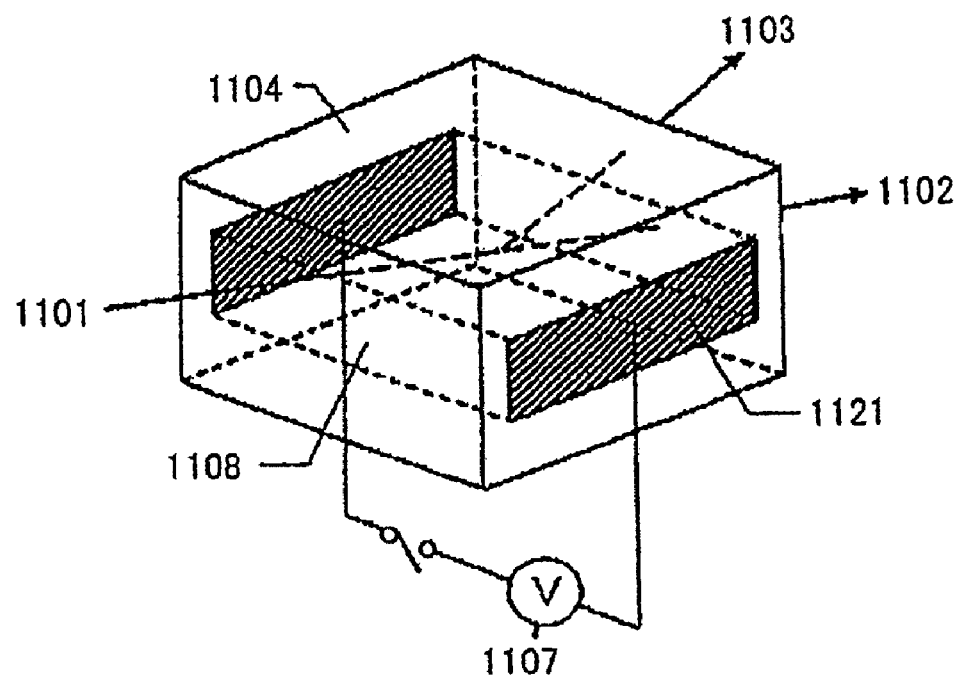
FIG. 1 is a view showing an optical switch which is relevant to the present invention.
Figure 21:
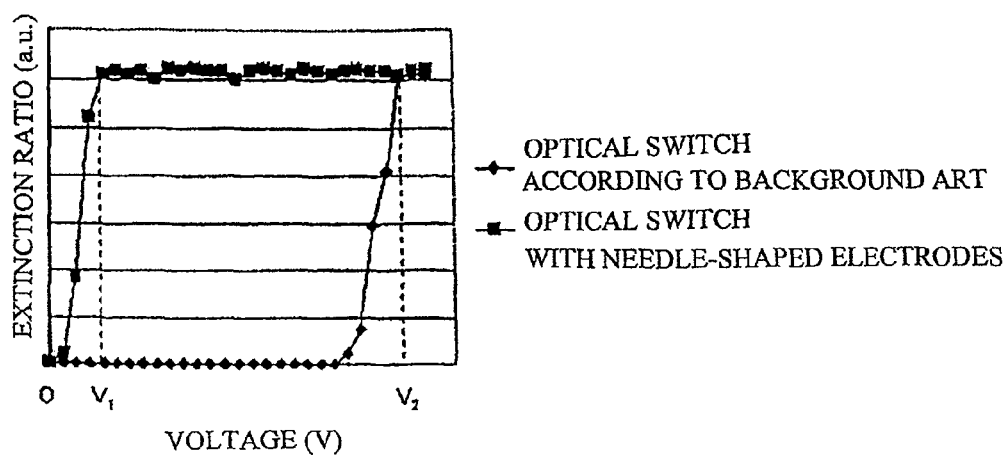
FIG. 21 is a graph showing the relationship between operating voltages and extinction ratios of an optical switch which is relevant to the present invention and an optical switch according to an example of the present invention.

FIG. 21 is a graph showing the relationship between operating voltages and extinction ratios of an optical switch which is relevant to the present invention and an optical switch according to an example of the present invention. The reduced distance between the electrodes according to the examples of the present invention is able to reduce the operating voltage. It can be seen from the graph that the operating voltage is at least about $\frac{1}{10}$ lower than in the case of the optical switch having electrodes on the opposite side surfaces of the electro-optical crystal whose thickness is about 1 mm as shown in FIG. 1.

Figure 22:
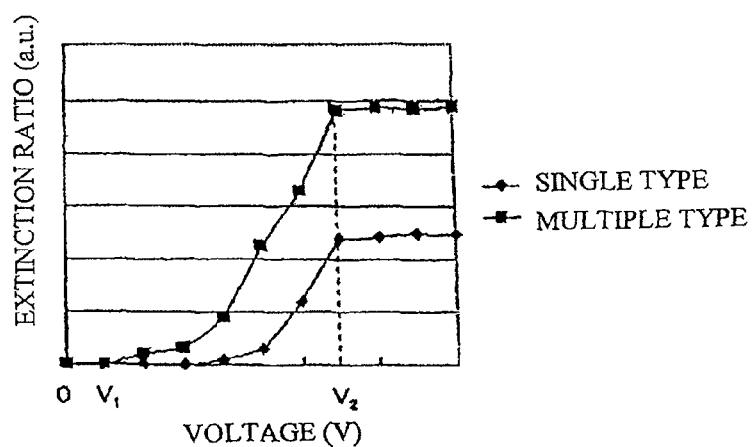
FIG. 22 is a graph showing the relationship plotted between operating voltages on a horizontal axis and extinction ratios on a vertical axis.

FIG. 22 is a graph showing the relationship plotted between operating voltages on a horizontal axis and extinction ratios on a vertical axis. The extinction ratios are calculated from voltage values that are produced by a photodetector which detects transmitted light 102 at the time when a voltage is applied to electrode assembly 102 and which detects transmitted light 102 at the time when no voltage is applied to electrode assembly 102. It can be seen from FIG. 22 that a multiple-type optical switch operates with a higher extinction ratio than a single-type optical switch.

The exemplary embodiments and examples described above are illustrated by way of example only, and their arrangements can be changed without departing from the scope of the invention.

The present application claims priority based on Japanese patent application No. 2007-161590 filed on Jun. 19, 2007, and incorporates herein the disclosure thereof in its entirety by reference.

The invention claimed is:

1. An optical switch for switching between transmission and total reflection of incident light applied to an electro-optical crystal by applying an electric field to the electro-optical crystal to thereby change the refractive index of the electro-optical crystal, comprising:
    an electrode assembly for applying an electric field to said electro-optical crystal, said electrode assembly comprising a plurality of electrodes disposed in said electro-optical crystal;
    wherein said electro-optical crystal has a refractive index changing portion whose refractive index is reduced by the electric field applied by said electrode assembly, irrespective of directions of the electric field, said refractive index changing portion enclosing said electrode assembly in its entirety, and said refractive index changing portion has a flat refractive index boundary face,
    wherein a total reflection surface is formed at an interface between the refractive index changing portion and a surrounding region of the refractive index changing portion by the electric field applied by the electrode assembly.

2. The optical switch according to claim 1, wherein said electrodes are arrayed in line, and a voltage is applied to said electrodes such that electrodes that are adjacent to said electrodes have different polarities.

3. The optical switch according to claim 1, wherein a plurality of said electrode assemblies is disposed on an optical path of said incident light.

4. The optical switch according to claim 3, wherein said electrode assemblies are spaced from each other by an interval which is at least three times the distance between the electrodes of the electrode assemblies.

5. The optical switch according to claim 1, wherein said electrodes comprise a needle-shaped or belt-shaped electron conductor.

6. An optical switch for switching between transmission and the total reflection of incident light applied to an electro-optical crystal by applying an electric field to the electro-optical crystal to thereby change the refractive index of the electro-optical crystal, comprising:

an electrode assembly disposed in said electro-optical crystal and comprising a plurality of electrodes having main cross sections of maximum areas disposed in one plane;

wherein said electro-optical crystal has a refractive index changing portion whose refractive index is reduced by the electric field applied by said electrode assembly, irrespective of directions of the electric field, said refractive index changing portion enclosing said electrode assembly in its entirety; and said refractive index changing portion controls the transmission and reflection of the incident light which is applied to said electrode assembly at an angle which is equal to or greater than a critical angle determined from the relationship between the refractive index of a crystal region, which is not affected by the electric field applied to said electro-optical crystal, and the refractive index of said refractive index changing portion, wherein a total reflection surface is formed at an interface between the refractive index changing portion and a surrounding region of the refractive index changing portion by the electric field applied by the electrode assembly.

7. The optical switch according to claim 6, wherein said electrodes are arrayed in line, and a voltage is applied to said electrodes such that electrodes that are adjacent to said electrodes have different polarities.

8. The optical switch according to claim 6, wherein a plurality of said electrode assemblies is disposed on an optical path of said incident light.

9. The optical switch according to claim 8, wherein said electrode assemblies are spaced from each other by an interval which is at least three times the distance between the electrodes of the electrode assemblies.

10. The optical switch according to claim 6, wherein said electrodes comprise a needle-shaped or belt-shaped electron conductor.

* * * * *